United States Patent
Lee et al.

(10) Patent No.: US 8,125,373 B2
(45) Date of Patent: Feb. 28, 2012

(54) MICROWAVE SYSTEM UTILIZING ELEVATIONAL SCANNING BY FREQUENCY HOPPING

(75) Inventors: Jae Seung Lee, Ann Arbor, MI (US); Paul D. Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/842,078

(22) Filed: Jul. 23, 2010

(65) Prior Publication Data

US 2012/0019408 A1  Jan. 26, 2012

(51) Int. Cl.
*G01S 13/00* (2006.01)
*G01S 13/08* (2006.01)

(52) U.S. Cl. .............. 342/83; 342/70; 342/82; 342/118; 342/128; 342/129

(58) Field of Classification Search .............. 342/70–72, 342/73, 82, 83, 118, 128, 129
See application file for complete search history.

(56) References Cited

U.S. PATENT DOCUMENTS

| | | | | |
|---|---|---|---|---|
| 5,087,918 A * | 2/1992 | May et al. | | 342/85 |
| 5,309,160 A * | 5/1994 | Powell et al. | | 342/128 |
| 5,563,602 A * | 10/1996 | Stove | | 342/70 |
| 5,592,179 A * | 1/1997 | Windyka | | 342/372 |
| 5,923,290 A * | 7/1999 | Mikami et al. | | 342/374 |
| 5,963,163 A * | 10/1999 | Kemkemian et al. | | 342/109 |
| 6,130,640 A * | 10/2000 | Uematsu et al. | | 342/175 |
| 6,337,656 B1 * | 1/2002 | Natsume et al. | | 342/149 |
| 6,703,967 B1 * | 3/2004 | Kuroda et al. | | 342/111 |
| 6,856,277 B2 * | 2/2005 | Katayama et al. | | 342/70 |
| 6,941,216 B2 * | 9/2005 | Isogai et al. | | 701/96 |
| 7,081,848 B1 * | 7/2006 | Adams | | 342/118 |
| 7,315,279 B1 * | 1/2008 | Milbourne | | 342/373 |
| 7,339,518 B2 * | 3/2008 | Natsume et al. | | 342/70 |
| 7,652,616 B2 * | 1/2010 | Inaba | | 342/70 |
| 7,786,927 B2 * | 8/2010 | Kondoh | | 342/109 |
| 7,791,530 B2 * | 9/2010 | Puglia | | 342/128 |
| 7,830,301 B2 * | 11/2010 | Margomenos | | 342/70 |
| 7,893,862 B2 * | 2/2011 | Holly et al. | | 342/22 |
| 7,982,660 B2 * | 7/2011 | Meinecke et al. | | 342/109 |
| 2007/0152871 A1 * | 7/2007 | Puglia | | 342/70 |
| 2009/0079620 A1 * | 3/2009 | Van Caekenberghe et al. | | 342/200 |

* cited by examiner

*Primary Examiner* — Thomas Tarcza
*Assistant Examiner* — Peter Bythrow
(74) *Attorney, Agent, or Firm* — Gifford, Krass, Sprinkle, Anderson & Citkowski, P.C.

(57) ABSTRACT

For use in conjunction with a microwave antenna having a radiator array configured to scan in a horizontal direction, a method for scanning in the vertical direction. A first FMCW microwave signal having a first bandwidth is transmitted at a first microwave frequency and the echo, if any, is received by the radiator array. A second FMCW microwave signal having a second bandwidth is also transmitted at a different center frequency and the echo, if any, is received by the radiator array. The different frequencies cause an elevational shift in the received signal. The receipt of the echoes is then processed to identify the location or locations of the object or objects causing the echo and communicating such location or locations to a user.

6 Claims, 3 Drawing Sheets

MICROWAVE SYSTEM UTILIZING ELEVATIONAL SCANNING BY FREQUENCY HOPPING

BACKGROUND OF THE INVENTION

I. Field of the Invention

The present invention relates to a microwave system of the type used in automotive vehicles and which achieves elevational scanning by frequency hopping.

II. Description of Related Art

Microwave systems using radio waves in the millimeter range have been allotted certain frequencies for automotive use. For example, the bandwidth of about 76.5 gigahertz-80 gigahertz has been allotted for automotive use by many countries. The bandwidth of allocation differs from country to country.

Many automotive systems utilize FMCW microwave systems with a radiator array for the antenna. The different elements in the radiator array are scanned in the horizontal direction using phase shifting for the various elements in the radiator array.

Previously, these FMCW automotive radar systems utilized the FMCW signal at a fixed frequency and the frequency modulation scanning at a fixed bandwidth. While this adequately provides horizontal scanning of the antenna, no previous attempt has been made to provide elevational scanning, i.e. scanning in the vertical direction. While such elevational scanning would be possible, for example, by mechanically tilting the antenna radiator array, the cost for doing so would be excessive with only a relatively small benefit. As such, these previously known automotive radar systems have not provided for any elevational scanning.

SUMMARY OF THE PRESENT INVENTION

The present invention provides an FMCW automotive radar system with elevational scanning which overcomes the above-mentioned disadvantages of the previously known systems.

Like the previously known FMCW automotive radar systems, the automotive radar system of the present invention utilizes a conventional antenna radiator array which is fixed in position relative to the vehicle. In the conventional fashion, the antenna array is scanned in the horizontal direction by using phase shifting of the antenna radiator array.

Unlike the previously known FMCW automotive radar systems, however, the method of the present invention uses frequency hopping to transmit FMCW signals at different center frequencies within the bandwidth allotted by the government. More specifically, in the present invention a first FMCW signal is transmitted at a first bandwidth and having a first microwave center frequency. The echo, if any, from that first microwave signal is then received by the radiator array. Thereafter, a second FMCW microwave signal is transmitted having a second bandwidth and at a second higher microwave center frequency. Although the first and second bandwidths may be the same in magnitude, the first and second center frequencies are spaced apart sufficiently so that the first and second bandwidths do not overlap each other.

An echo, if any, is then received of the second microwave signal, on the antenna radiator array. Those echo or echoes are then processed to identify the location or locations of the object or objects causing the echo and that information is then communicated to a user. The above steps are then continuously reiterated.

Since the antenna radiator array is fixed, the second FMCW signal automatically provides an elevational upward shift due to the phase shift in the radiator array.

At least two different center frequencies for the FMCW microwave signal are necessary for the present invention. However, three or even more different microwave signals having different center frequencies may be used without deviating from the scope of the invention.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
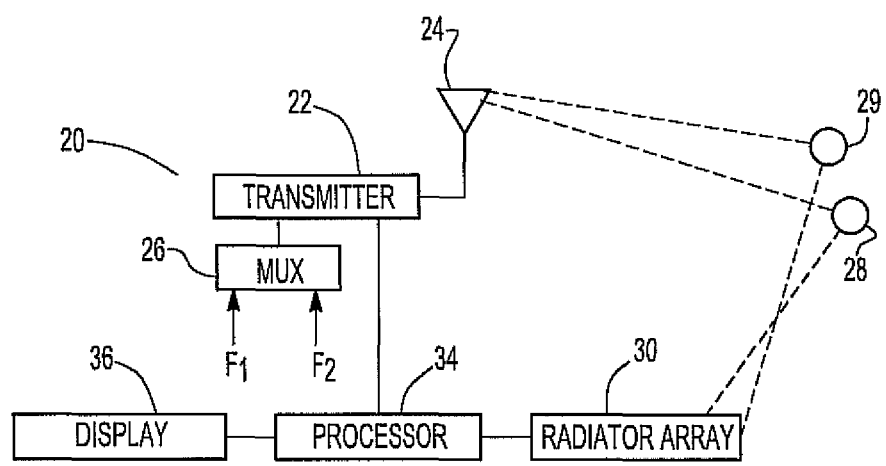
FIG. 1 is a block diagrammatic view illustrating a preferred embodiment of the present invention.

With reference first to FIG. 1, a simplified block diagrammatic view illustrating the system of the present invention is shown. The system 20 includes a microwave transmitter 22 which transmits a frequency modulated CW signal on its antenna 24. The transmitter 22 transmits microwave signals in the millimeter wavelength range, e.g. 76 gigahertz-80 gigahertz.

The transmitter 22, furthermore, transmits the FMCW signal on its antenna 24 at least two different center frequencies $F_1$ and $F_2$. A multiplexer 26 may be used to select between the center frequency $F_1$ and $F_2$ and the FMCW signal is alternately and iteratively transmitted on the two signals $F_1$ and $F_2$. In the conventional fashion, each center frequency is frequency modulated by a ramp or other waveform.

Figure 2:
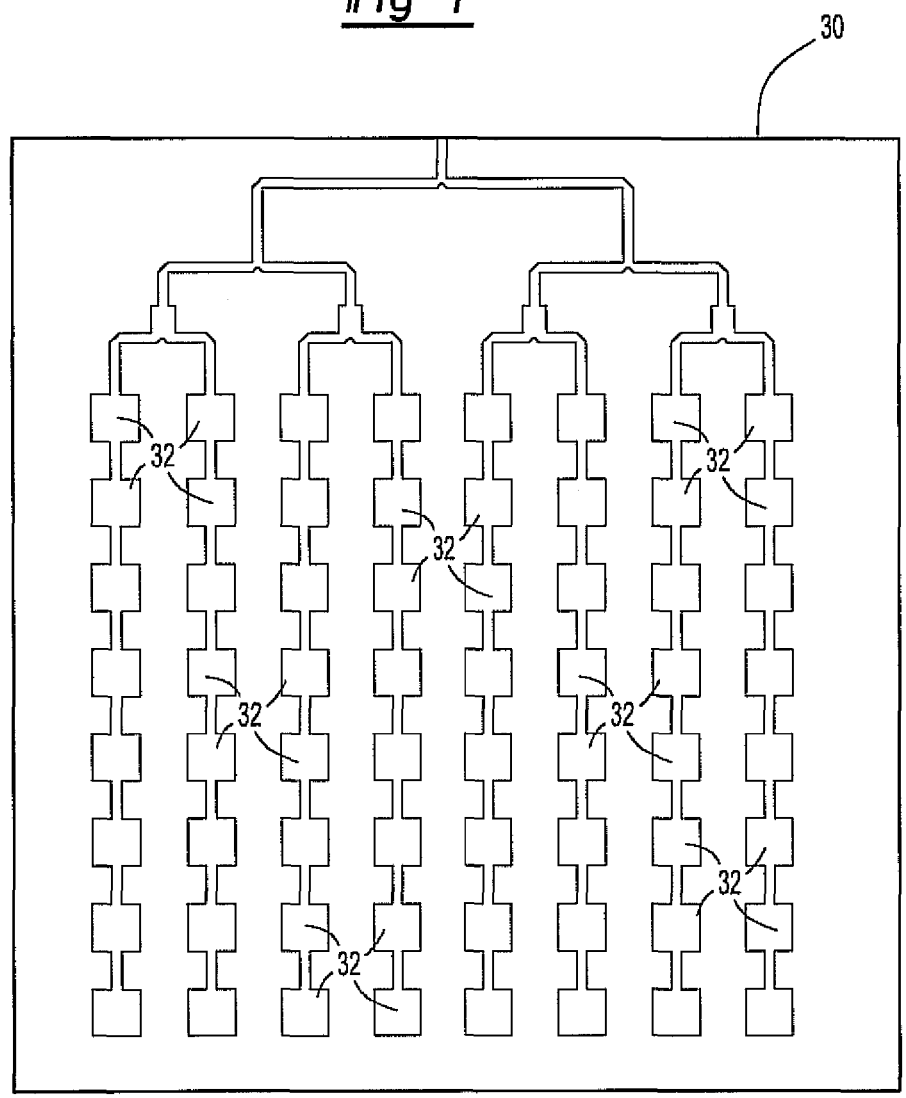
FIG. 2 is a plan view illustrating a radiator antenna array.

In the well known fashion, an object 28 causes the transmitted microwave signal to bounce back to a radiator array 30. An exemplary radiator array 30 is illustrated in FIG. 2 and includes a plurality of radiators 32 mounted in an array and adapted to be scanned in a horizontal position by phase shifting of the radiators 32. Such phase shifting to determine the horizontal position of an object causing an echo back to the radiator array 30 is well known to those skilled in the art.

The output from the radiator array 30 is then coupled to a processor 34 (FIG. 1) which also receives a signal from the transmitter 22 representative of the frequency $F_1$ or $F_2$. In a fashion that will be subsequently described in greater detail, the processor 34 then determines not only the horizontal position of the object 28 but also the elevation of the object 28 or 29 and communicates the results of the processing to the user via a display 36. The above process is continuously iteratively repeated.

Figure 3:
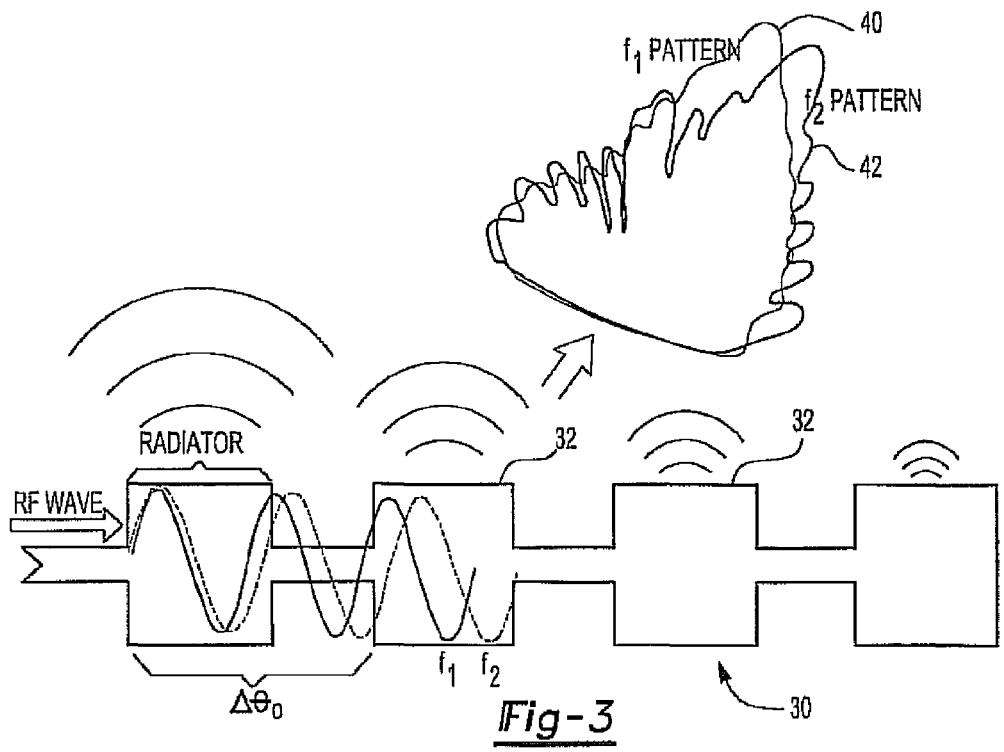
FIG. 3 is a diagrammatic view illustrating the propagation of different frequency signals through the radar antenna array.

With reference now to FIG. 3, a very small portion of the antenna array 30 having the radiators 32 is illustrated as well as the propagation of the echo of the microwave signal from the transmitter 22 at frequency $F_1$ and frequency $F_2$. Since the radiators 32 are fixed in size, and the microwave center frequencies $F_1$ and $F_2$ separated from each other by frequency, the propagation of the frequencies $F_1$ and $F_2$ through the antenna radiators 32 are shifted relative to each other so that the position of the wavelength relative to each of the radiators 32 is somewhat different for frequency $F_1$ as opposed to frequency $F_2$.

This difference in the phase shift causes the beam to tilt in the vertical or elevational direction. This beam tilt is illustrated in FIG. 3 as a beam tilt pattern 40 for the frequency $F_1$ and a beam tilt pattern 42 for the frequency $F_2$.

This beam tilt is perhaps better illustrated by reference to FIG. 4 in which three different frequencies, $F_1$, $F_2$ and $F_3$, are distributed across the entire microwave band from 76.5 gigahertz to 80 gigahertz. The center frequency for each frequency $F_1$, $F_2$ and $F_3$ is selected so that the bandwidths created by the FMCW signal for each of the three frequencies $F_1$, $F_2$ and $F_3$ are mutually exclusive of each other. Furthermore, it will be understood that three frequencies are illustrated in FIG. 4 by way of example only and that two different frequencies, or four or more frequencies, may be utilized without deviation from the scope or spirit of the present invention.

Figure 4:
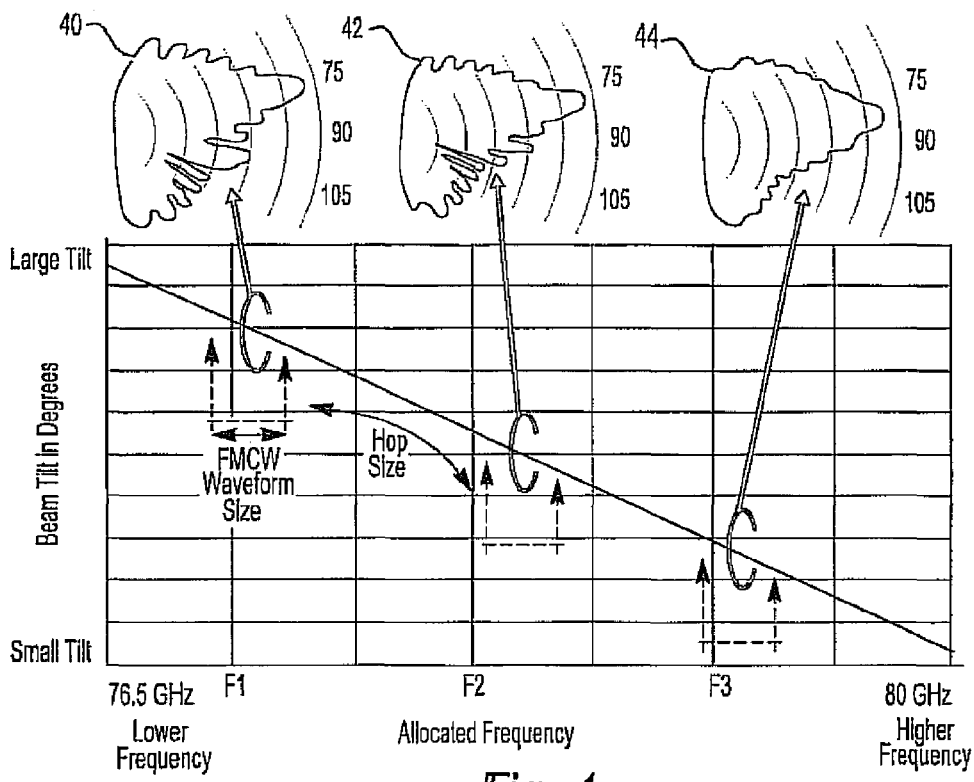
FIG. 4 is a graph illustrating the vertical beam tilt for different frequencies.

Still referring to FIG. 4, each FMCW waveform signal around the center frequencies F1 and F2 has a bandwidth less than the frequency spacing between the center frequencies F1 and F2. Thus the first and second center frequencies are spaced apart in frequency by a frequency greater than the first bandwidth and also greater than the second bandwidth, or greater than either the first or second bandwidth if they are the same. The same is also true for the FMCW waveform signals around center frequencies F2 and F3. Consequently, the FMCW waveform signals are not only mutually exclusive of each other, but each FMCW waveform signal is spaced apart in frequency from its adjacent FMCW waveform(s).

Still referring to FIG. 4, the elevational band tilt for the different frequencies is illustrated at propagation waveform 40 for the frequency $F_1$, the propagation pattern 42 for the frequency $F_2$, and the propagation pattern 44 for the frequency $F_3$. As is clear from the scale adjacent each of the patterns 40, 42 and 44, the beam tilt at frequency $F_1$ is approximately 75 degrees, increases to about 78 degrees for the pattern 42 and further increases to about 81 degrees for the pattern 44.

Figure 5:
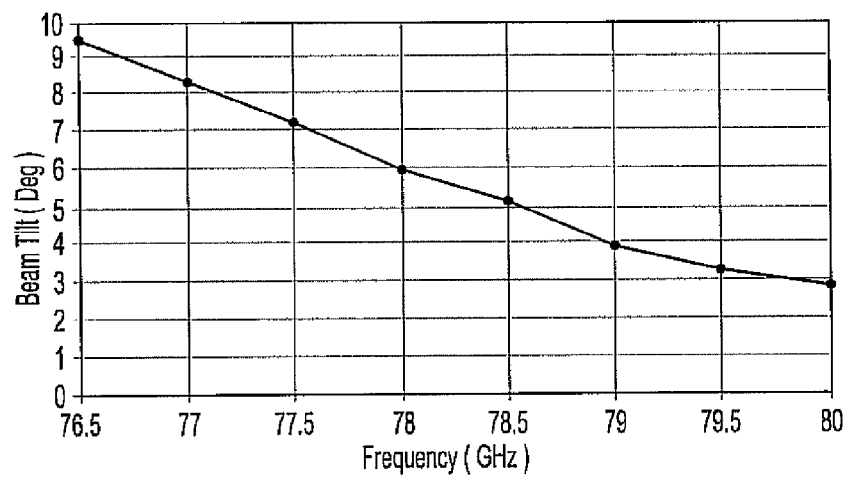
FIG. 5 is a graph of beam tilt versus frequency.

The beam tilt versus the center frequency is shown in FIG. 5 for a fixed antenna radiator array. At 76.5 gigahertz, the tilt is about 9.4 degrees and diminishes to about 3 degrees at 80 gigahertz. Consequently, an elevational shift of just over 6 degrees may be obtained by merely changing the center frequency for the FMCW frequency within the band of 76.5 gigahertz to 80 gigahertz. Different microwave bands will produce different elevational shifts.

Figure 6:
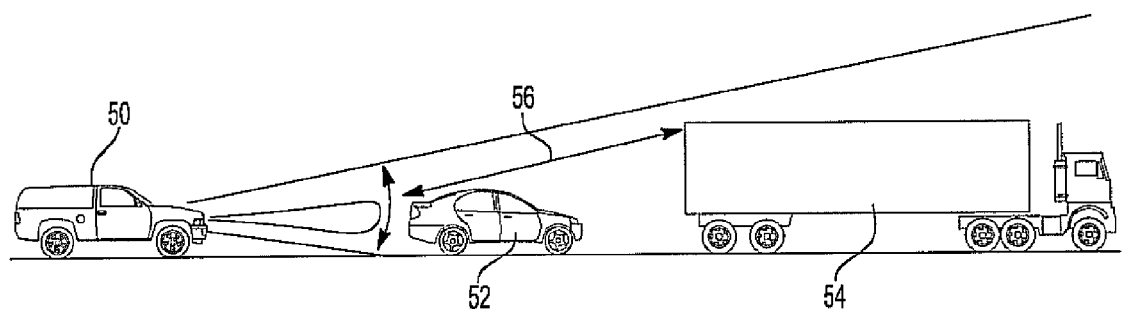
FIG. 6 is a diagrammatic view illustrating the operation of the present invention.

With reference now to FIG. 6, the advantage of utilizing the vertical scanning according to the present invention is shown in which a vehicle 50 utilizing the system of the present invention trails a car 52 as well as a truck 54 in front of the car 52. The lower elevational beam transmission from the radar system in the vehicle 50 may detect the car 52 whereas a higher beam elevation illustrated by arrow 56 would pass over the vehicle 52 and detect the truck 54. Such information would be particularly useful, for example, during nighttime driving conditions where the truck 54 may not be visible to the vehicle 50.

From the foregoing, it can be seen that the present invention provides a very simple system and method for elevational or vertical scanning of an automotive radar system. Having described our invention, however, many modifications thereto will become apparent to those skilled in the art to which it pertains without deviation from the spirit of the invention as defined by the scope of the appended claims.

We claim:

1. For use in conjunction with a microwave antenna having a radiator array configured to scan in a horizontal direction, a method for scanning in the vertical direction comprising the steps of:
   a) transmitting a first FMCW microwave signal having a first bandwidth at a first microwave center frequency,
   b) receiving an echo of said first microwave signal, if any, on the radiator array,
   c) thereafter transmitting a second FMCW microwave signal having a second bandwidth at a second microwave center frequency, said first and second center frequencies being spaced apart in frequency by a frequency greater than said first bandwidth and also greater than said second bandwidth,
   d) receiving an echo of said second microwave signal, if any, on the radiator array,
   e) processing the receipt of such echo or echoes to identify the location or locations of an object or objects causing the echo or echoes and communicating such location or locations to a user, and
   reiterating steps a)-e).

2. The method as defined in claim 1 wherein said first and second bandwidths are mutually exclusive.

3. The method as defined in claim 1 wherein said first and second center frequencies are between 76 GHz and 80 GHz.

4. For use in conjunction with a microwave antenna having a radiator array configured to scan in a horizontal direction, a system for scanning in the vertical direction comprising:
   a) a transmitter which transmits a first FMCW microwave signal having a first bandwidth at a first microwave center frequency,
   b) a receiver which receives an echo of said first microwave signal, if any, on the radiator array,
   c) said transmitter then transmitting a second FMCW microwave signal having a second bandwidth at a said microwave center frequency, said first and second center frequencies being spaced apart in frequency by a frequency greater than said first bandwidth and also greater than said second bandwidth,
   d) said receiver then receiving an echo of said second microwave signal, if any, on the radiator array,
   e) a processor which processes the receipt of such echo or echoes to identify the location or locations of an object or objects causing the echo or echoes and communicating such location or locations to a user, and
   reiterating steps a)-e).

5. The method as defined in claim 1 wherein said first and second bandwidths are mutually exclusive.

6. The method as defined in claim 1 wherein said first and second center frequencies are between 76 GHz and 80 GHz.

* * * * *